March 14, 1933.  W. D. ARCHEA  1,901,490
MILLING MACHINE
Filed May 2, 1930
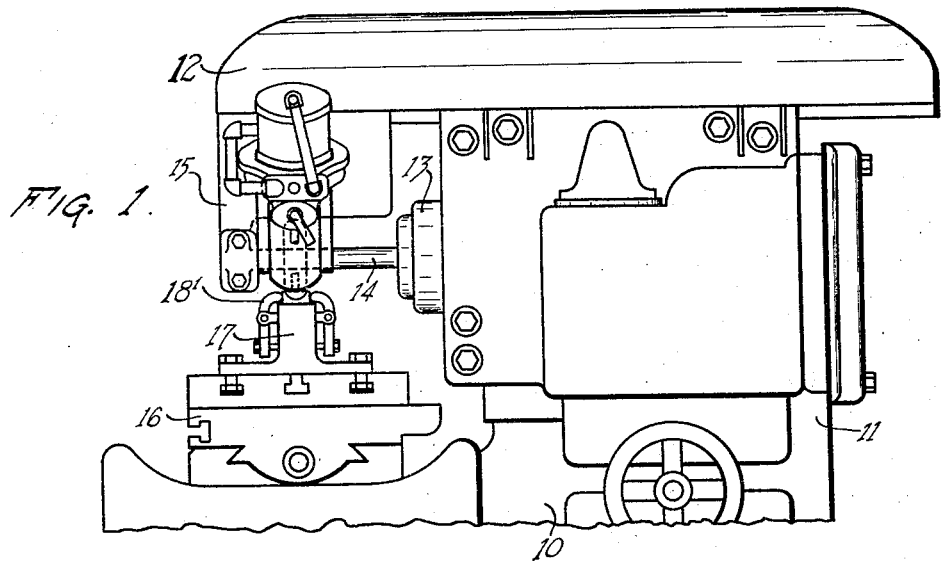
Fig. 1.
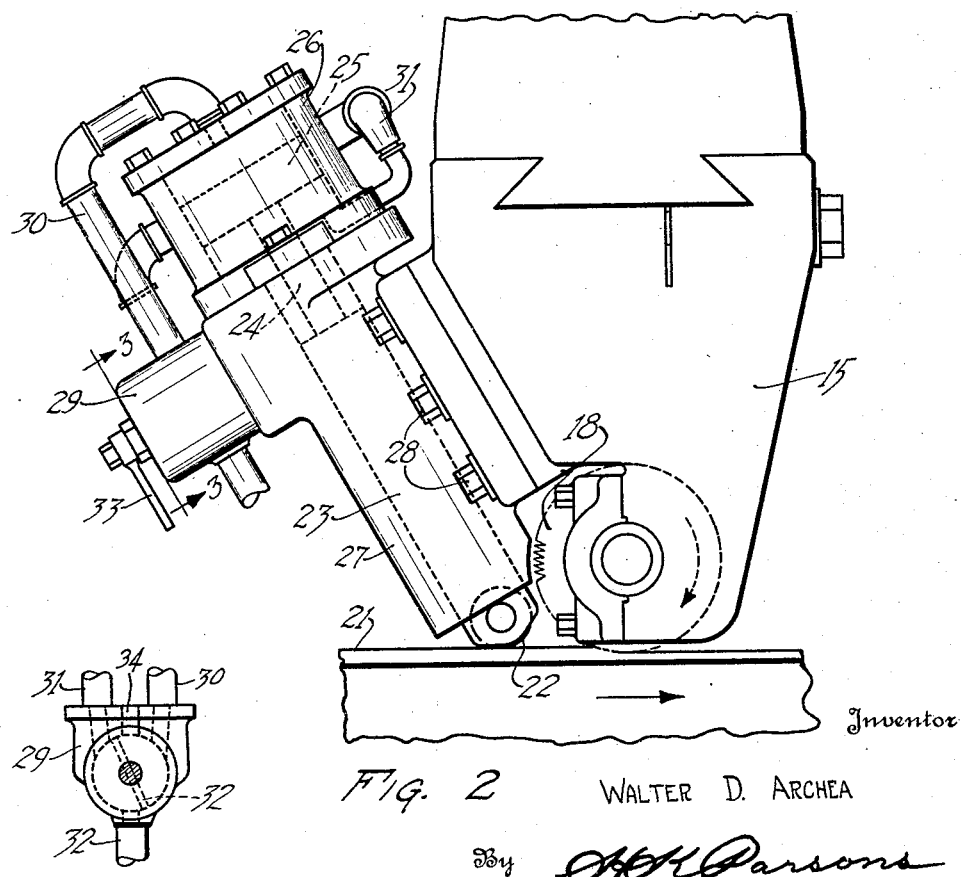
Fig. 2
Fig. 3
Inventor
WALTER D. ARCHEA
By AHK Parsons
Attorney

UNITED STATES PATENT OFFICE

WALTER D. ARCHEA, OF CINCINNATI, OHIO, ASSIGNOR TO THE CINCINNATI MILLING MACHINE COMPANY, OF CINCINNATI, OHIO, A CORPORATION OF OHIO

MILLING MACHINE

Application filed May 2, 1930. Serial No. 449,181.

This invention relates to milling machines and more particularly to an improved machine for operating upon work pieces that do not have sufficient rigidity to permit of positive clamping.

In the manufacture of light slender work pieces such as turbine blades, for instance, considerable difficulty has been experienced in providing satisfactory work holding means therefor due to the lack of sufficient gripping surfaces on the work itself by which it may be held positively against movement during a milling operation and it is therefore one of the objects of this invention to provide a structure that is adapted to hold such work during a cutting operation without the danger of bending or permanently deforming or distorting the same.

Another object of this invention is the provision of a milling machine having an outboard roller for exerting a continuous pressure on a work piece to cause sufficient frictional resistance between the piece and its support to assist to a large degree in preventing longitudinal movement during a cutting operation.

A further object of this invention is the provision of an outboard roller mounted in advance of the cutter for engaging the unfinished surface of a work piece and continuously exerting a clamping pressure on that portion of the work that is just in advance of the portion being cut thus applying the clamping pressure at a very efficient point.

Other objects and advantages of the present invention should be readily apparent by reference to the following specification considered in conjunction with the accompanying drawing illustrative of one embodiment thereof but it will be understood that any modifications may be made in the specific structural details hereinafter disclosed within the scope of the appended claims without departing from or exceeding the spirit of the invention.

Referring to the drawing in which like reference numerals indicate like parts,

Figure 1 is an elevation of a machine tool showing one embodiment of the invention.

Figure 2 is an enlarged detail view of an outboard roller and its attached mechanism.

Figure 3 is a detail view as on the line 3—3 of Figure 2.

In carrying out the invention the machine illustrated in Figure 1 has been chosen for illustrative purposes only as the invention is equally adaptable to milling machines of other types. The reference numeral 10 indicates the base of a milling machine having the column 11 for supporting an overarm 12 and a cutter spindle 13. An arbor 14 is rotatably supported at one end in the spindle and journaled at the other end in the pendant 15 attached to the outboard end of the overarm.

Supported upon the base 10 is the reciprocable table 16 having the work support 17 upon which the work may be mounted for operation thereupon by the cutter 18 carried by the cutter arbor. This work support is provided with lateral guides 18' between which the work piece may be gripped and also with terminal work gripping elements if desired.

Since the work pieces 21 are long and slender and of rather soft material it is necessary to provide additional clamping means in order to prevent lifting or buckling thereof when subject to the action of the cutter. One form that this means may take, is illustrated in Figures 1 and 2 and comprises an outboard roller 22 mounted upon the end of a reciprocable member 23 terminating in a piston rod 24 and piston 25 mounted in the cylinder 26. A housing 27 surrounds the member 23 and provides a support therefor and for the cylinder. The housing is attached to the pendant 15 by securing means, such as the bolts 28.

In order to control the movements of the roller, a valve 29 is provided on the housing 27 having the channels or pipes 30 and 31 leading therefrom to opposite ends of the cylinder 26. An inlet or pressure line 32 leading from a suitable source of pressure is connected to the bottom of the valve as shown in Figure 3. The valve may be of any known type and in this case comprises a vane 32 adapted to be rotated by the handle 33 to connect the pressure port 32 with either pipe 30 or 31 and the exhaust port 34 with the other pipes.

The operation is such that pressure is admitted above the piston to hold the roller in pressure contact with the work during a cutting operation and to the opposite side of the piston to hold the roller away from the work table while changing work pieces.

In the embodiment shown it will be noted that a single roller has been shown, but it will be understood that in machines having multiple work holders that a plurality of these rollers may be used and connected up in series for joint operation.

What is claimed is:

1. A milling machine having a column, a reciprocating table supported thereby, a cutter arbor journaled in the column, an overarm carried by the column and extending parallel to said arbor, a pendent adjustably mounted on the overarm for journaling the outboard end of said arbor, a work holder mounted on the table, means to exert a clamping pressure on work mounted in the holder comprising a housing attached to the pendant, a cylinder formed therein having a piston, roller means attached to the end of the piston for contacting the work, a source of fluid pressure and valve means for controlling the admission of pressure to opposite ends of the cylinder to cause movement of the roller to or from the work.

2. In a milling machine having a rotatable cutter, a work table mounted for relative movement with respect thereto, means to secure a work piece to the table, additional means for exerting a resilient clamping pressure on the work including an outboard roller carried by a fixed part of the machine, fluid actuated means for moving the roller relative to the cutter to a clamping position and a control valve for said fluid actuated means movable to one position to cause lowering of the roller during the cutting operation and into a second position to raise the roller during idle movement of the table.

3. A milling machine having a support, a work table carried thereby, an over-arm, a cutter arbor projecting from said support adjacent the table, a cutter mounted on the arbor, said table adapted to feed work relative to the cutter, a pendant supported by the overarm for journaling the outboard end of the arbor, a piston rod reciprocably mounted in the pendant, a pressure roller journaled at one end of the rod, a piston secured to the opposite end of the rod, a cylinder formed in the pendant for reciprocably receiving the piston and means to admit pressure to one end of the cylinder to move the roller into pressure contact with the work to prevent relative movement thereof with respect to the table during feeding movement of the table relative to the cutter.

4. A milling machine having a column, a reciprocating table mounted thereon, a cutter arbor journaled in the column and carrying a cutter, a work support on the table for feeding work to the cutter, an over-arm carried by the column for supporting the arbor, means supported by the over-arm comprising a piston and cylinder for clamping the work to the table, a piston rod attached to the piston, a pressure roller journaled in the opposite end of the rod for engaging the work, and means to admit pressure to the cylinder and thereby hold the roller in contact with the work during the feeding operation.

In testimony whereof I affix my signature.

WALTER D. ARCHEA.